United States Patent
Gaknoki et al.

(10) Patent No.: US 8,467,157 B2
(45) Date of Patent: Jun. 18, 2013

(54) ADJACENT TERMINAL FAULT DETECTION

(75) Inventors: Yury Gaknoki, San Jose, CA (US); Yue Zhang, Mountain View, CA (US); Mingming Mao, Saratoga, CA (US)

(73) Assignee: Power Integrations, Inc., San Jose, CA (US)

( * ) Notice: Subject to any disclaimer, the term of this patent is extended or adjusted under 35 U.S.C. 154(b) by 146 days.

(21) Appl. No.: 13/193,507

(22) Filed: Jul. 28, 2011

(65) Prior Publication Data

US 2013/0027815 A1   Jan. 31, 2013

(51) Int. Cl.
*H02M 3/335* (2006.01)

(52) U.S. Cl.
USPC .................. 361/18; 363/21.12; 363/21.17

(58) Field of Classification Search
USPC ............................................................ 361/18
See application file for complete search history.

(56) References Cited

U.S. PATENT DOCUMENTS

| | | | |
|---|---|---|---|
| 2007/0008749 A1* | 1/2007 | Baurle et al. | 363/21.12 |
| 2011/0193494 A1* | 8/2011 | Gaknoki et al. | 315/297 |
| 2011/0194312 A1* | 8/2011 | Gaknoki et al. | 363/21.12 |
| 2012/0087156 A1* | 4/2012 | Matthews | 363/21.12 |
| 2012/0320640 A1* | 12/2012 | Baurle et al. | 363/21.17 |

\* cited by examiner

*Primary Examiner* — Jared Fureman
*Assistant Examiner* — Kevin J Comber
(74) *Attorney, Agent, or Firm* — Morrison & Foerster LLP

(57) ABSTRACT

This relates to detecting unwanted couplings between a protected terminal and other terminals in an integrated controller of a power supply. Offset and clamp circuitry may apply a positive or negative offset voltage and clamp current to one or more terminals of the controller. In the event that a terminal having the offset voltage and clamp current is accidentally coupled to the protected terminal, the offset voltage and clamp current may be applied to the protected terminal. The protected terminal may be coupled to a fault detection circuitry operable to detect a fault signal at the protected terminal. The fault detection circuitry of the controller may cause the power supply to shut down in response to a detection of the fault signal at the protected terminal or may cause the power supply to shut down in response to a detection of a predefined threshold number of cycles in which the fault signal is detected.

24 Claims, 7 Drawing Sheets

ADJACENT TERMINAL FAULT DETECTION

BACKGROUND

1. Field

The present disclosure relates generally to power supplies, and, more specifically, the present disclosure relates to controllers for power supplies.

2. Background Information

Many electronic devices include a power supply to provide the device with a regulated direct current (DC) power source. One type of power supply that may be used to provide the regulated DC source is a switched mode power supply, which is popular due to its small size, good output regulation, high efficiency, and safety features. Switched mode power supplies may be used to convert an alternating current (AC) source or a high voltage DC source into a regulated DC source having a desired voltage. Based on the specific application, different types of switched mode power supplies with different control methods and different features may be used.

Typically, a switched mode power supply includes a switching element coupled to an energy transfer element. The energy transfer element provides galvanic isolation, preventing direct current from flowing between the input and the output of the power supply. Common examples of energy transfer elements include a transformer and coupled inductor, where electrical energy received by an input winding on the input side is stored as magnetic energy that may be converted back to electrical energy at the output side across an output winding.

Switched mode power supplies typically include a controller for causing the switching element to be switched between an ON state and an OFF state to regulate the amount of power transmitted across the energy transfer element and delivered to a load. The output of the energy transfer element may then be rectified and filtered to provide a regulated DC output.

Some switched mode power supplies include a controller for output regulation to maintain properties of the output between predefined threshold values. For instance, the controller may be implemented in an integrated circuit (IC) having multiple input and output terminals and configured to receive signals representative of the parameters of the switch mode power supply, process the sensed signals, and generate control signals to control the switching element to regulate the output of the power supply. For example, the controller may receive a feedback signal representative of the output of the power supply. Based on this signal, the controller may adjust the switching characteristics of the switching element to vary the amount of power transferred to the output of the energy transfer element, and thus, the output of the power supply.

Since the operation of the controller is based at least in part on the feedback signal, it is important that the feedback signal accurately reflects the output voltage. Errors in the feedback signal, for example, caused by a short, or unwanted coupling, between the feedback terminal of the controller and an adjacent terminal may result in improper output regulation, thereby causing the power supply to generate an output having an incorrect voltage.

Thus, circuitry for detecting unwanted couplings between terminals of a controller are desired.

BRIEF SUMMARY

Methods and apparatuses are disclosed for detecting unwanted couplings between a protected terminal and other terminals in an integrated controller of a power supply. In some embodiments, offset and clamp circuitry may apply a positive or negative offset voltage and clamp current to one or more terminals of the controller. In the event that a terminal having the offset voltage and clamp current is accidentally coupled to the protected terminal, the offset voltage and clamp current may be applied to the protected terminal. The protected terminal may be coupled to a fault detection circuitry operable to detect a fault signal at the protected terminal. In some embodiments, the controller may cause the power supply to shut down in response to a detection of the fault signal. In other embodiments, the controller may cause the power supply to shut down in response to a detection of a threshold number of cycles in which the fault signal is detected. Additional features of the present disclosure will become apparent from the detailed description, figures, and claims set forth below.

BRIEF DESCRIPTION OF THE FIGURES

Non-limiting and non-exhaustive embodiments of the present invention are described with reference to the following figures, wherein like reference numbers refer to like parts throughout the various views unless otherwise specified.

DETAILED DESCRIPTION

Figure 1:
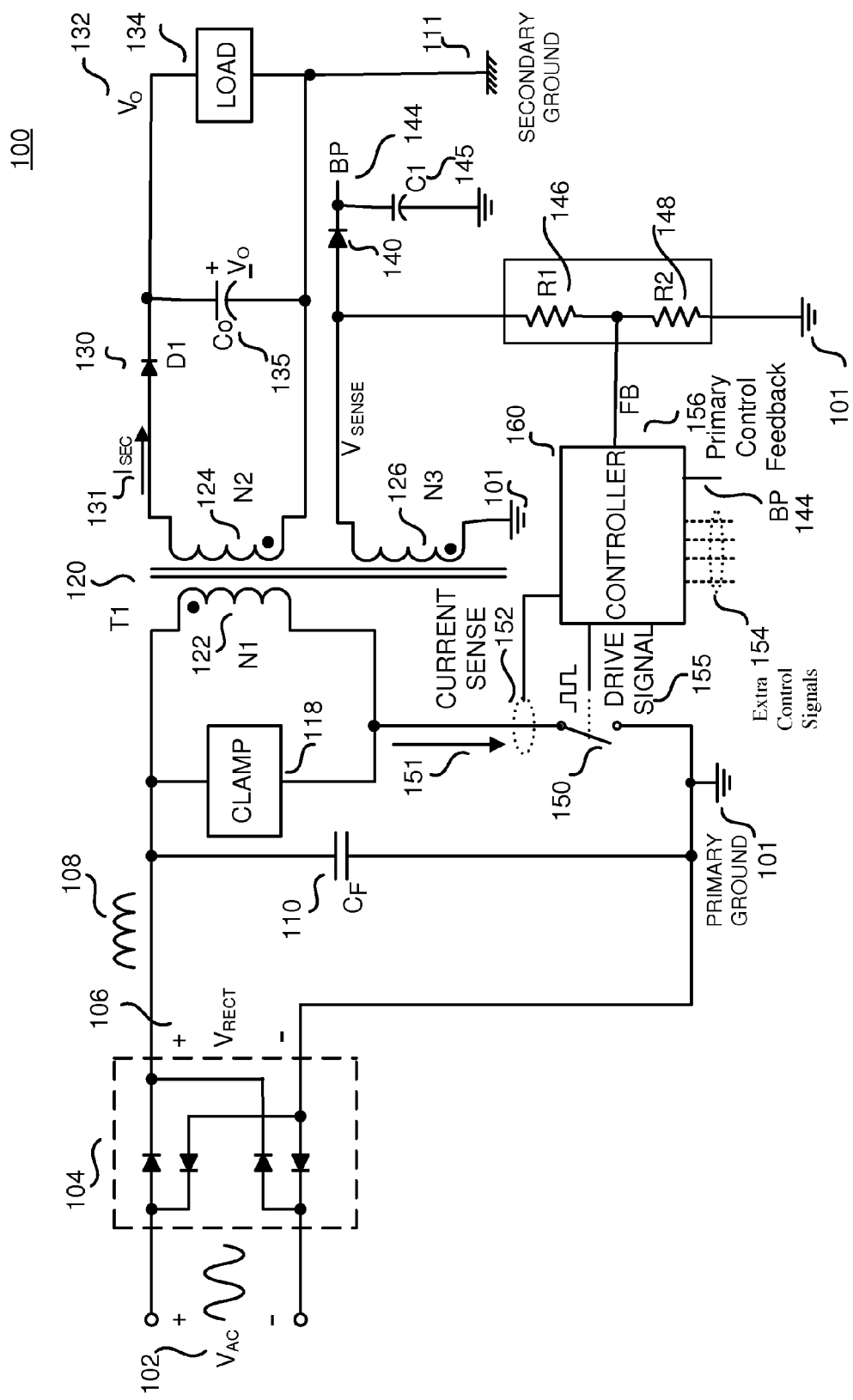
FIG. 1 illustrates a circuit diagram of an exemplary flyback converter with primary side control.

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment," "an embodiment," "one example," or "an example" means that a particular feature, structure, or characteristic described in connection with the embodiment or example is included in at least one embodiment of the present invention. Thus, appearances of the phrases "in one embodiment," "in an embodiment," "one example," or "an example" in various places throughout this specification are not necessarily all referring to the same embodiment or example. Furthermore, the particular features, structures, or characteristics may be combined in any suitable combinations and/or subcombinations in one or more embodiments or examples. Particular features, structures, or characteristics may be included in an integrated circuit, an electronic circuit, a combinational logic circuit, or other suitable components that provide the described functionality. In addition, it should be appreciated that the figures provided herewith are for explanation purposes to persons ordinarily skilled in the art and that the drawings are not necessarily drawn to scale.

In order to provide a thorough understanding of the present invention, in some embodiments, numerous specific details are set forth and, in some cases, simplified equivalent implementation circuits have been described. However, it will be apparent to one having ordinary skill in the art that the equivalent simplified circuits may differ from the actual implementations and that all specific details need not be employed to practice the various embodiments.

Additionally, it should be appreciated that in the description below and in all described examples, a switched mode power supply may include a controller incorporated into an integrated circuit (IC) having some or none of the switching and power components in a monolithic or hybrid structure.

Various embodiments are described below for detecting unwanted couplings between a protected terminal and another terminal (e.g., a terminal adjacent to the protected terminal) of an integrated controller of a power supply. In some examples, offset and clamp circuitry is used to apply a positive or negative offset voltage and clamp current to one or more terminals of the controller (e.g., applying an offset voltage and clamp current to a terminal adjacent to the protected terminal). In the event that a terminal having an offset voltage and clamp current is accidentally coupled to the protected terminal, the offset voltage and clamp current are applied to the protected terminal. Fault detection circuitry coupled to the protected terminal is used to detect a fault condition when the offset voltage and clamp current are applied to the protected terminal.

FIG. 1 illustrates a circuit diagram of an exemplary switched mode power supply 100 that may be controlled using a controller 160 having circuitry to detect an electrical coupling between two terminals of the controller, such as an electrical short between the feedback terminal and an adjacent terminal of the controller. Power converter 100, also referred to herein as a "power supply," is provided as a general example of a converter that may be controlled using controller 160, which, in some examples, is included within an integrated circuit. In other examples, controller 160 and switch 150 are included in a single integrated circuit.

In operation, power converter 100 provides output power to load 134 from an unregulated AC input voltage 102, also referred to herein as an "input voltage." In some examples, power supply 100 includes a bridge rectifier 104 for rectifying the AC input voltage 102 to generate unregulated rectified DC voltage $V_{RECT}$ 106 having a half sine wave 108. Bridge rectifier 104 may include four diodes arranged as shown in FIG. 1. In some examples, DC voltage $V_{RECT}$ 106 is filtered through capacitance $C_F$ 110 and applied at the input of the magnetic energy transfer element T1 120, which is coupled to the switching element 150.

In the example shown in FIG. 1, the energy transfer element 120 includes a coupled inductor, having an input winding 122 and an output winding 124. The input winding may also be referred to herein as a "primary winding," and the output winding may also be referred to herein as a "secondary winding." Energy transfer element 120 provides galvanic isolation between the input side and the output side of power converter 100 to prevent direct current from flowing between the input side and the output side of the converter. As shown, a primary ground 101 is electrically coupled to circuitry referred to as being on the input side of power converter 100. Similarly, a secondary ground 111 is electrically coupled to circuitry referred to as being on the output side of power converter 100. In some examples, the primary ground 101 and the secondary ground 111 are isolated, while in other examples, the primary ground 101 and the secondary ground 111 are coupled together.

As shown in the illustrated example of FIG. 1, the energy transfer element 120 further includes an auxiliary or bias winding 126 that provides an AC bidirectional sensed voltage $V_{SENSE}$ that is used to provide feedback signal FB to controller 160 through the resistive divider formed by resistors R1 146 and R2 148. The AC bidirectional sensed voltage $V_{SENSE}$ is representative of input voltage $V_{RECT}$ 106 when switch current 151 is flowing through input winding 122, and is representative of output voltage $V_O$ 132 when a secondary current $I_{SEC}$ 131 is flowing through output winding 124. In some examples, sensed voltage $V_{SENSE}$ is representative of an input voltage $V_{RECT}$ 106 during at least a portion of the time when switching element 150 is in the ON state, and representative of output voltage $V_O$ 132 during at least a portion of the time when switching element 150 is in the OFF state. In operation, when the switching element 150 is in the ON state, switch current 151 is allowed to flow through the input winding 122, causing the sensed voltage $V_{SENSE}$ to be representative of a voltage that is proportional to the input voltage $V_{RECT}$ 106. The ratio between the reflected voltage $V_{SENSE}$ and the input line voltage $V_{RECT}$ 106 is the same as the ratio between the number of turns in bias winding 126 and the number of turns in the input winding 122. An example relationship that exists between the turns ratio and voltage ratio is shown below:

$$\frac{V_{SENSE}}{V_{RECT}} = \frac{N_3}{N_1} \quad (1)$$

where $N_3$ is the number of turns on bias winding 126 and $N_1$ is the number of turns on primary winding 122. When switching element 150 transitions from an ON state to an OFF state, switch current 151 is substantially prevented from flowing through switching element 150 and the energy stored in input winding 122 is transferred to secondary winding 124, causing the sensed voltage $V_{SENSE}$ to be representative of a voltage that is proportional to the output voltage $V_O$ 132. The ratio between the sensed voltage $V_{SENSE}$ and the output voltage $V_O$ 132 is the same as the ratio between the number of turns in bias winding 126 and the number of turns in secondary winding 124. An example relationship that exists between the turns ratio and the voltage ratio is shown below:

$$\frac{V_{SENSE}}{V_O + V_F} = \frac{N_3}{N_2} \quad (2)$$

where $N_3$ is the number of turns on bias winding 126, $N_2$ is the number of turns on secondary winding 124, and $V_F$ is the voltage across the rectifier 130 when it is forward biased. When $V_F$ is negligible with respect to $V_O$, the expression may be simplified to $$\frac{V_{SENSE}}{V_O} \approx \frac{N_3}{N_2} \quad (3)$$

In some examples, power converter 100 further includes clamp circuit 118 coupled across primary winding 122 of energy transfer element 120. Clamp circuit 118 is used to limit the maximum voltage across switching element 150 due to the inductance of primary winding 122 and caused by the abrupt change in current when switching element 150 is switched to the OFF state. In some examples, primary winding 122 is coupled to switching element 150 such that, in operation, energy transfer element 120 receives energy with an input current 151 when switching element 150 is in an ON state, and energy transfer element 120 delivers energy to the output of power converter 100 after switching element 150 is switched to an OFF state. In some examples, the clamp circuit 118 includes a resistor, capacitor, and rectifier.

Switching element 150 may be used to control the transfer of energy through the energy transfer element 120 from the input terminals of power converter 100 to the output terminals of power converter 100. Switching element 150 may be used to regulate an output of power supply 100 by switching between an ON state and an OFF state. More specifically, switching element 150 may be configured to be driven to an ON state, allowing current to be conducted through the switch while operating in its saturation region, and an OFF state, substantially preventing current from being conducted through the switch.

As shown in the illustrated example, switching element 150 is coupled between a primary terminal of the energy transfer element 120 and primary ground 101. In some examples, switching element 150 includes a transistor, such as a metal oxide semiconductor field effect transistor (MOSFET), bipolar junction transistor (BJT), or any other transistor, or any other switch.

As mentioned above, power converter 100 includes controller 160 coupled to switching element 150. Controller 160 is configured to control switching element 150 using a switching or drive signal, noted as "DRIVE SIGNAL" 155 in FIG. 1. The drive signal output of controller 160 is electrically coupled to the gate or control terminal of switching element 150 and is operable to drive switching element 150 between an ON state and an OFF state.

Controller 160 is configured to regulate the output voltage of power converter 100 by switching element 150 between an ON state and an OFF state to control the amount of power delivered to the output. During a switching event, when switching element 150 is in an ON state, switch current 151 flows through energy transfer element 120. The amount of current 151 conducted when switching element 150 is ON is determined based in part on the input voltage, the inductance of the primary winding, and the time that switching element 150 remains in the ON state. The switch current 151 is zero, or at least close to zero, when switching element 150 is in the OFF state. When switching element 150 is transitioned from the ON state to the OFF state, current flows through secondary winding 124. The current is then rectified by diode D1 130 and filtered by capacitor Co 135 to produce output voltage $V_O$ 132 and output current $I_{SEC}$ 131. Thus, in operation, controller 160 causes switching element 150 to produce pulsating currents in the rectifier 130, which, in the illustrated example, includes a diode 130 that is filtered by output capacitor Co 135 to produce the substantially constant output voltage $V_O$ 132.

In some examples, controller 160 receives the feedback signal FB on feedback terminal FB 156, information relating to the switch current 151 through the current sense 152, and additional control signals on terminals 154. Based on these inputs, controller 160 generates the output DRIVE SIGNAL 155 to control switching of the switching element 150, thereby controlling the transfer of energy to the output. For example, controller 160 uses feedback signal FB, which is indirectly representative of the output voltage, to adjust the rate, magnitude, and/or duration of the pulsating current in primary winding 122 to provide the power required to maintain the desired output voltage. As shown in FIG. 1, feedback circuitry sends a feedback signal FB to controller 160, which allows indirect sensing of the output voltage from the input side of the power supply. Feedback signal FB is equivalent to, or a scaled version of, bias voltage $V_{SENSE}$. As described above, due to the magnetic coupling in energy transfer element 120, energy is delivered to output winding 124 and to bias winding 126 after switching element 150 is switched to an OFF state. The magnetic coupling further causes the voltage induced across output winding 124 to be substantially proportional to the voltage across bias winding 126. In this manner, bias voltage $V_{SENSE}$ increases to a voltage representative of the output voltage when energy is transferred during the OFF state. In some instances, controller 160 uses feedback signal FB to directly regulate bias voltage $V_{SENSE}$ to a desired voltage that is representative of a desired output voltage. For example, bias voltage $V_{SENSE}$ may be regulated to 20 V in order to indirectly regulate the output voltage to 5 V.

In some examples, bias winding voltage $V_{SENSE}$ includes an AC voltage that, when the switching element is in an OFF state and energy is being transferred to the output, is positive due to the same winding direction of the bias 126 and secondary 124 windings. This positive signal is representative of the output and is utilized as the feedback signal FB for the controller. When the switching element is in an ON state, the energy transfer between the input and the output is blocked and the bias winding voltage $V_{SENSE}$ is negative due to the opposite direction of the bias 126 and primary 122 windings. This negative signal is representative of the input line and is utilized for the line over/under voltage fault detection. The AC bias voltage $V_{SENSE}$ is rectified (by diode 140), filtered (by capacitor C1, 145), and provides the BP supply 144 for the controller.

In some examples, power converter 100 further includes two or more resistors R1 146 and R2 148 forming a resistive divider for setting the bias voltage level. Specifically, resistors R1 146 and R2 148 may be coupled to bias winding 126 to provide a divided-down or scaled bias winding voltage $V_{SENSE}$ as the feedback signal FB to controller 160. Values for resistors R1 146 and R2 148 may be selected based at least in part on the bias winding voltage $V_{SENSE}$ and the internal feedback reference of the controller. As mentioned above, the feedback signal FB is received by controller 160 and is representative of the sensed input voltage when switching element 150 is in the ON state, and representative of the sensed output voltage when switching element 150 is in the OFF state.

In some examples, the bias winding 126 further provides a supply voltage BP 144 to controller 160 through rectifier 140 and filter capacitance C1 145. Additionally, in some examples, controller 160 includes features to employ any of a variety of control methods including, but not limited to, ON/OFF control, ON/OFF control with varying current limit levels, pulse width modulation (PWM), and the like.

It should be appreciated that in some examples, controller 160 (and its individual components) and switching element 150 may be implemented as a monolithic integrated circuit, may be implemented with discrete electrical components, or may be implemented in a combination of discrete components and integrated circuits. For example, switching element 150 may be included within controller 160 with its "drain terminal" coupled to the energy transfer element 120 and its "source terminal" coupled to primary ground 101. In other examples, switching element 150 may not be included as part of the integrated circuit, and controller 160 may be used to control a switching element 150 that is manufactured as a device separate from controller 160.

Figure 2:
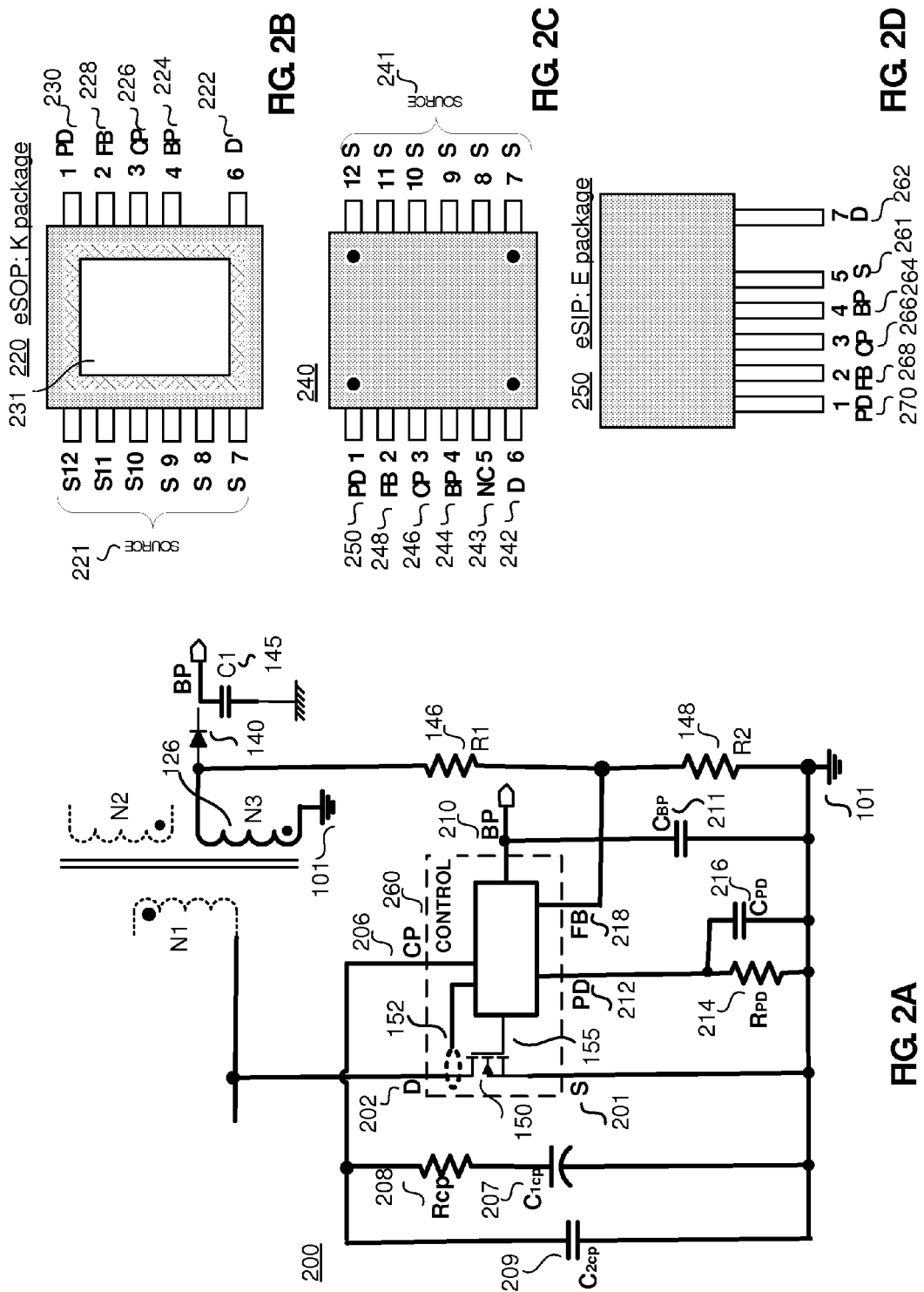
FIG. 2A illustrates couplings for terminals of an exemplary controller.
FIG. 2B-D illustrate exemplary controller integrated circuit packaging structures.

FIG. 2A illustrates a circuit diagram 200 showing couplings for an exemplary controller 260 that may be similar or identical to controller 160 having an integrated switching element 150 and that may utilize a monolithic or hybrid silicon structure. In some examples, the illustrated couplings of exemplary controller 260 and the sample packages shown in FIGS. 2B, 2C, and 2D are used with a switched mode power supply similar or identical to switched mode power supply 100 of FIG. 1. For example, controller 260 may be used with a switched mode power supply that implements peak current limit ON-OFF primary control and that is configured to provide input and output information to the controller 260 through a magnetic coupling element.

Controller 260 includes feedback terminal FB 218 for sensing the input and output voltages of the power supply. In some examples, feedback terminal FB 218 is coupled to the bias winding 126 of energy transfer element 120 through a resistive divider formed by resistors R1 146 and R2 148. The bias winding 126 is magnetically coupled to the core of the energy transfer element 120 in reference to the primary ground 101.

In the example shown in FIG. 2A, controller 260 includes an integrated switching element 150. In some examples, switching element 150 includes a MOSFET integrated on the controller package either monolithically on the same silicon or as hybrid dies in the same package.

In some examples, controller 260 further includes drain terminal D 202 and source terminal S 201 for coupling to the drain and source of the integrated switching element 150. Controller 260 further includes a supply or bypass terminal BP 210 for receiving a DC power supply to power the controller. As mentioned above, the controller power supply coupled to BP terminal 210 is provided by the bias winding 126 through the rectifier 140 and the coupling capacitors C1 145 and $C_{BP}$ 211. Controller 260 further includes a programming terminal PD 212 for programming the characteristics of the controller, such as current limit thresholds, shut down or auto restart time delays, and the like. In some examples, the programming terminal PD 212 is coupled to the programming components, such as capacitor $C_{PD}$ 216 and resistor $R_{PD}$ 214. In some examples, controller 260 further includes a compensation terminal CP 206 that may be coupled to the compensation components, such as resistor $R_{cp}$ 208, capacitor $C1_{cp}$ 207, and capacitor $C2_{cp}$ 209.

FIGS. 2B-D illustrate exemplary packages that may be used for controllers 160 or 260. For example, FIG. 2B illustrates a package 220 designed with an exposed pad 231 for improved heat transfer and noise immunity. Terminals 7-12 on the left side of package 220 are coupled to the source 221 of switching element 150 and act as a heat sink to dissipate heat in switching element 150. In some examples, a double spacing is included between the drain that is coupled to terminal 6, D 222 and bypass terminal 4, BP 224 as a safety measure for the high voltage and electric field of the drain terminal 6, D 222. In some examples, feedback terminal 2, FB 228 is located between programming terminal 1, PD 230 and compensation terminal 3, CP 226. The clearance space between terminals 1 and 2 or between terminals 2 and 3 in different package types may be about 0.05" (1.27 mm) to 0.1" (2.54 mm). However, it should be appreciated that other clearance space values may also be used.

FIG. 2C illustrates another exemplary package 240 that may be used for controllers 160 or 260. In some examples, the terminals located on the right side of package 240 are coupled to the source 241 of switching element 150 and act as a heat sink to dissipate heat in switching element 150. In some examples, instead of including a double clearance spacing for the drain terminal 6, D 242, terminal 5, NC 243 is included next to terminal 6, D 242. However, terminal 5, NC 243 is designated as a no connect NC to provide separation (more clearance space) between the high voltage on drain terminal 6, D 242 and bypass terminal 4, BP 244. Similar to package 220 shown in FIG. 2B, programming terminal 1, PD 250, feedback terminal 2, FB 248, compensation terminal 3, CP 246, and bypass terminal 4, BP 244 are placed adjacent to each other and are separated by a clearance of about 0.05" (1.27 mm) to 0.1" (2.54 mm).

FIG. 2D illustrates yet another exemplary package 250 that may be used for controller 260. Package 250 is a vertical Single Inline Pins (SIP) package in which the drain terminal 7, D 262 is located with double clearance spacing to source terminal 5, S 261. Additionally, similar to packages 220 and 240, the feedback terminal 2, FB 268 is located adjacent to the programming terminal 1, PD 270 and the compensation terminal 3, CP 266 and is separated by a clearance of about 0.05" (1.27 mm) to 0.1" (2.54 mm). In the illustrated example the bypass terminal 4, BP 264 is located between the compensation terminal 3, CP 266 and source terminal 5, S 261.

Due to the small clearance spacing between terminals of most IC packages and the small spacing between terminal footprints on printed circuit boards (PCBs), it is possible that an unwanted coupling, or shorting, may accidentally be formed between the feedback FB terminal and an adjacent terminal. This may be problematic as the feedback terminal provides the output and input data to the controller that is used for regulation and stability of the power supply operation. Errors on the feedback terminal due to shorting to another terminal may result in inaccurate data being provided to the controller, causing output instability.

To detect the unwanted coupling between the feedback terminal and another terminal, such as an adjacent terminal, offset and clamp circuitry and fault detection circuitry may be used. Specifically, various embodiments are described below for detecting unwanted coupling between a terminal, such as the feedback terminal FB of a controller, and an adjacent terminal, such as the programming terminal PD and compensation terminal CP. In some embodiments, an offset voltage and clamp current are applied to the adjacent terminals such that a fault signal may be detected by circuitry coupled to the feedback FB terminal in the event that the feedback terminal FB shorts or couples to one or more of the adjacent terminals.

Figure 3:
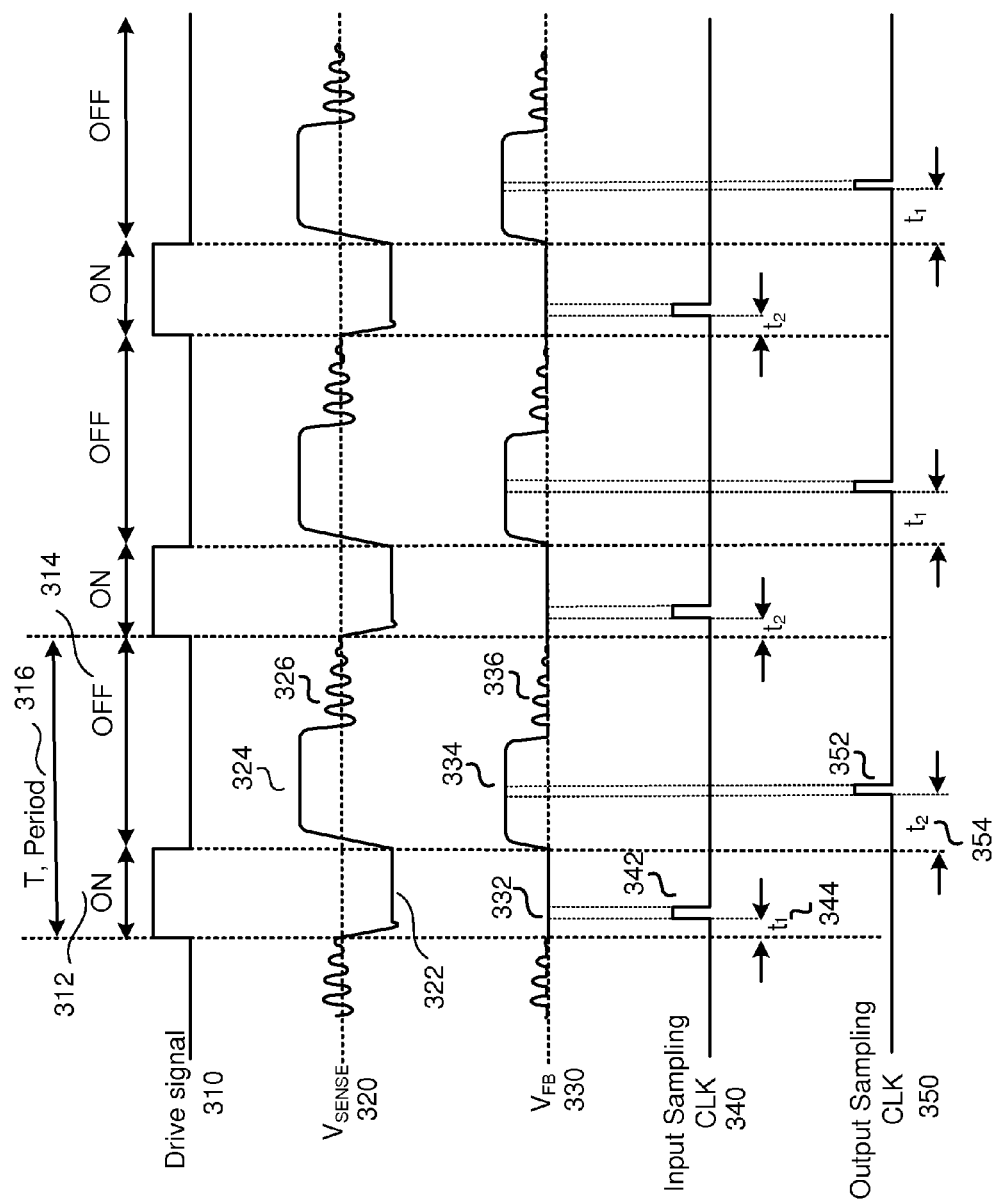
FIG. 3 illustrates exemplary waveforms relating to feedback terminal sampling.

To illustrate, FIG. 3 shows exemplary waveforms relating to feedback terminal sampling when there is no short or coupling between the feedback terminal FB and an adjacent terminal. As shown in FIG. 3, for each period T 316 of a switching cycle, the drive signal 310 is at a high voltage level to drive a switching element to an ON state for duration 312 and at a low voltage level to drive a switching element to an OFF state for duration 314.

$V_{SENSE}$ 320 represents the sensed AC voltage induced in the bias (auxiliary) winding 126 of the energy transfer element 120 of FIG. 1. During the ON time 312 of drive signal 310, current flows through the switching element; however, because of the opposite direction of the primary 122 and secondary windings 124 and due to the coupling direction of diode D1, 130 no current flows in the secondary winding of the energy transfer element. Additionally, due to opposite winding directions of primary winding 122 and the bias winding 126 of FIG. 1, the induced AC voltage $V_{SENSE}$ 320 goes negative 322 during switch ON time 312. During the OFF time 314 of drive signal 310, current begins to flow in the secondary winding. Due to the same winding directions of secondary winding 124 and the bias winding 126 of FIG. 1, the induced AC voltage $V_{SENSE}$ 320 is positive 324 during at least a portion of switch OFF time 314. In discontinuous conduction mode operation, after the transfer of energy to the secondary winding is complete and before the drive signal 310 drives the switching element to the ON state, some oscillations 326 may occur due to parasitic capacitance and inductance of the primary circuit.

While the switching element is in the OFF state, the feedback voltage $V_{FB}$ 330 appearing on the feedback terminal FB is a scaled down voltage of sensed voltage $V_{SENSE}$ 320 on the bias winding. The voltage 330 is determined based on the ratio of the resistive voltage divider formed by resistors R1 146 and R2 148. However, as will be discussed in greater detail below with respect to FIGS. 4 and 5, when the switching element is in the ON state, the voltage 330 appearing on the feedback terminal FB is prevented from going negative due to circuitry clamping the voltage to zero. Instead, during the time that the switch is in the ON state, a current may be sourced out of the feedback terminal and represents the input voltage level.

During the time that the switching element is in the OFF state, the energy stored in the energy transfer element 120 of FIG. 1 is transferred to the secondary winding, resulting in the feedback voltage $V_{FB}$ 330 appearing on the feedback terminal being a scaled down voltage of the sensed voltage $V_{SENSE}$ 320 representative of the output voltage of the power converter. This scaled down voltage is utilized to control switching events of the switching element to regulate the output of the converter. In discontinuous conduction mode operation, after the transfer of energy to the secondary winding is complete and before the drive signal 310 drives the switching element to the ON state, some oscillations 326 may occur due to parasitic capacitance and inductance of the primary circuit. However, portions of the oscillation below zero may also be clamped to zero.

Input sampling clock 340 includes pulses 342 that are used to trigger retrieval of information from the input line during the time that the switching element is in the ON state and after an appropriate delay $t_1$ 344 from the switching element transitioning to the ON state. Similarly, the output sampling clock 350 includes pulses 352 that are used to trigger retrieval of information from the output during the time that the switching element is in the OFF state and after an appropriate delay $t_2$ 354 from the switching element transitioning to the OFF state.

Figure 4:
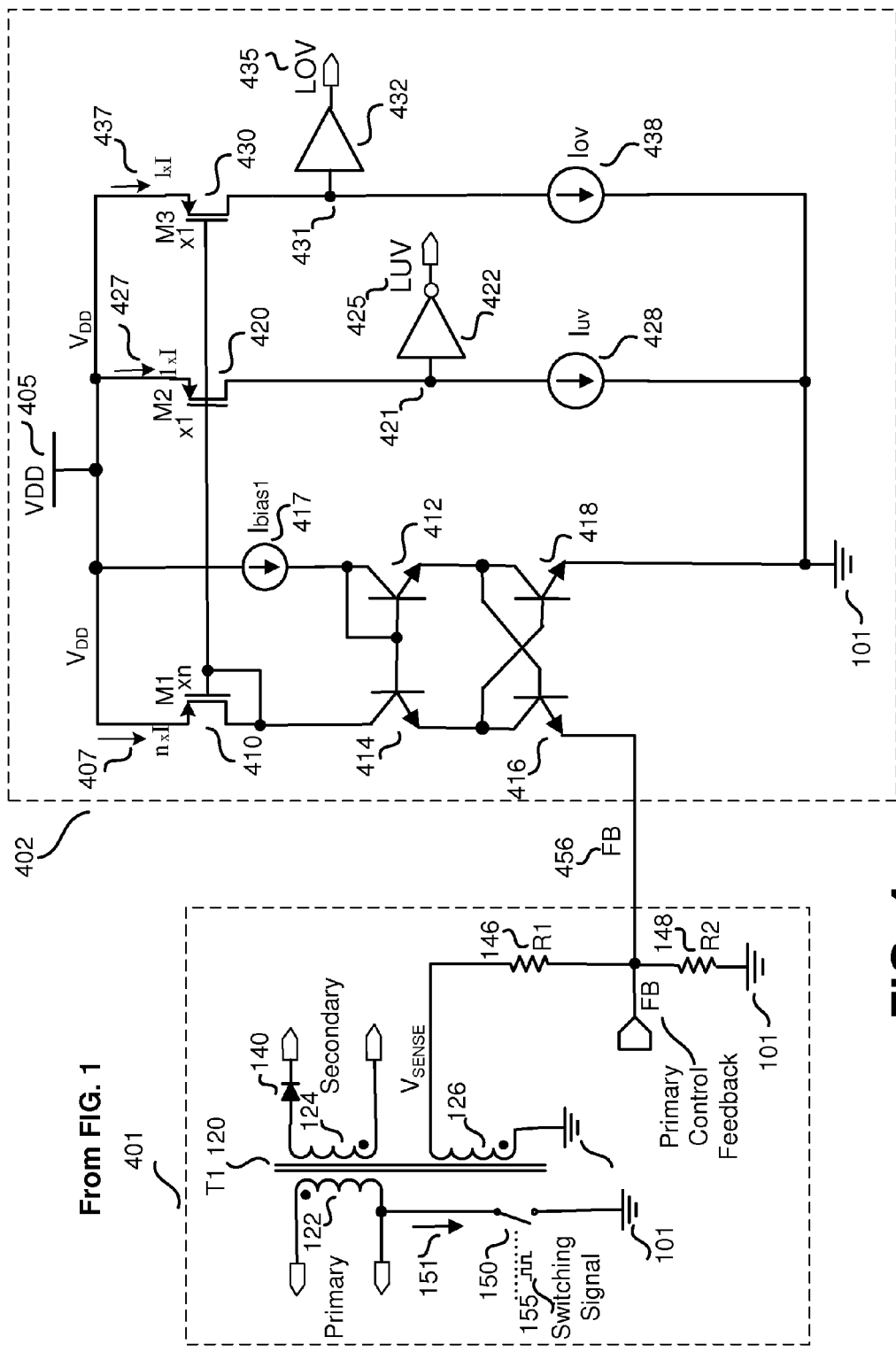
FIG. 4 illustrates a simplified operational circuit diagram of exemplary input line fault detection circuitry.

FIG. 4 illustrates a circuit diagram of exemplary fault detection circuitry 402 that may be used to detect shorts or couplings between a feedback terminal and an adjacent terminal of a controller. In some examples, fault detection circuitry 402 is coupled to feedback sensing circuitry 401 having components similar or identical to those shown in FIGS. 1 and 2. In other examples, fault detection circuitry 402 is at least partially included within controller 160 or 260. In some examples, the sensed voltage $V_{SENSE}$ 320 of the bias winding 126 is coupled to fault detection circuitry 402 at node FB 456 through the resistive divider formed by resistors R1 146 and R2 148.

As discussed above, input and output voltage information is retrieved through the voltage induced in the bias winding 126 on the magnetic core of energy transfer element 120. When switching element 150 is in the ON state, a switch current 151 passes through the primary winding 122 and the generated flux induces a voltage having the opposite polarity at secondary winding 124 and bias winding 126. Due to the coupling direction of rectifier 140 at the secondary side, no energy is transferred to the output. The negative voltage at the bias winding 126 is applied through the resistive divider formed by resistors R1 146 and R2 148 on the feedback terminal FB that is coupled to node FB 456 of the fault detection circuitry 402.

However, fault detection circuitry 402 clamps the voltage at node FB 456 to the zero potential of ground during negative intervals of $V_{SENSE}$ 320 by sourcing a current to the feedback terminal FB/node FB 456 that is proportional to the negative voltage value induced in the bias winding 126. Specifically, from the supply bus VDD 405, current is supplied through the current mirror coupling of FET transistors M1 410, M2 420, and M3 430. In some examples, the channel size of the diode connected FET transistor M1 410 is larger than the channels of FET transistors M2 420 and M3 430, thereby providing "n" times more current capability (n×I) in comparison to FET transistors M2 420 and M3 430. This allows scaling down of the mirrored currents 427 (1×I) and 437 (1×I) in comparison to the current 407 (n×I) that results in power saving in the protection circuitry.

In some examples, the base terminals of transistors 412 and 414 are coupled together and a bias current source Ibias1 417 supplies a bias current to the diode connected transistor 412 and to the transistor 414. The current source Ibias1 417 also biases transistor 416 with its base terminal coupled to the emitter of transistor 412. A current 407 (n×I), also referred to herein as a "fault detection current," is sourced from VDD supply 405 through the diode connected FET 410 and the biased transistors 414 and 416 to the feedback terminal/node FB 456 to clamp the voltage at this node to zero, preventing it from going negative. Each of transistors 416 and 418 has its base coupled to the collector of the other transistor that results in a cross coupling of the transistors. In some examples, as shown in FIG. 4, transistors of 412, 414, 416, and 418 are shown as BJT (Bipolar Junction Transistors); however it should be appreciated by those of ordinary skill in the art that MOSFET transistors may alternatively be used.

In some examples, since transistors 416 and 418 are of the same type/structure and cross coupled, it is ensured that the voltage drop across the transistors 416 and 418 remains the same. As a result, the voltage on node FB 456 would be clamped to the ground zero potential, regardless of the different current values passing through the transistors 416 and 418. Thus, as the voltage on the FB terminal attempts to become more negative, more current from VDD supply 405 is supplied through transistors 410, 414, and 416 to the node FB 456 to clamp it at zero voltage.

The current through diode connected transistor M1 410 is mirrored on M2 420 and M3 430 with a scale down current ratio of 1/n. As long as the current 437 through M3 430 is below the reference current threshold of line over voltage $I_{OV}$ 438, the output signal LOV 435 of the buffer 432 remains low. However, as the current 437 begins to exceed the line over voltage threshold $I_{OV}$ 438, node 431 at input of buffer 432 is pulled high and the line over voltage signal LOV 435 at the output of buffer 432 goes high and Line Over Voltage (LOV) protection circuitry is activated.

Similarly, as in the example of FIG. 4, because the buffer 422 is an inverting output buffer, as soon as the current 427 through M2 420 goes below the reference current threshold of line under voltage $I_{UV}$ 428, node 421 is pulled low to ground and the output signal LUV 425 of the buffer 422 goes high and Line Under Voltage (LUV) protection circuitry is activated. In this way, fault detection circuitry 402 is capable of detecting voltages above an upper threshold and voltages below a lower threshold applied at feedback terminal FB/node FB 456 during negative intervals of $V_{SENSE}$ 320 induced on bias winding 126.

Figure 5:
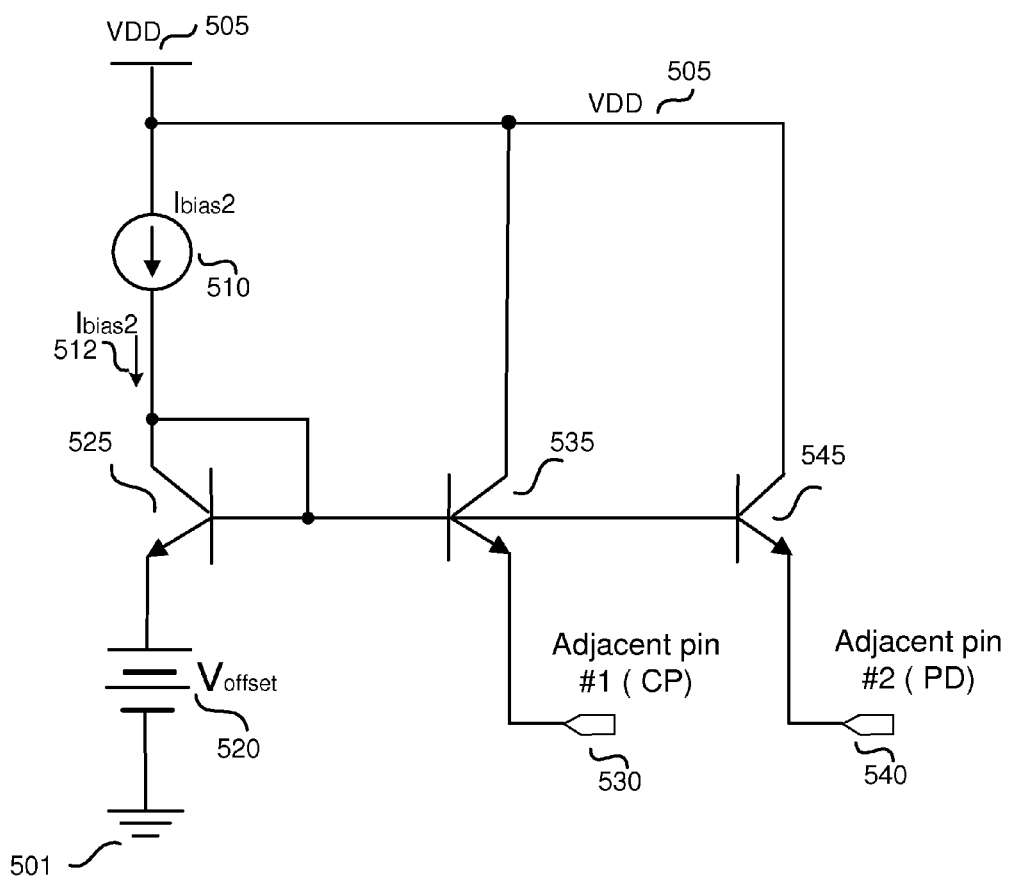
FIG. 5 illustrates a circuit diagram of exemplary offset and clamp circuitry.

FIG. 5 illustrates exemplary offset and clamp circuitry 500 for applying an offset voltage $V_{offset}$ 520 and clamp current to the terminals adjacent to the feedback terminal FB according to various embodiments of the present disclosure. In some examples, adjacent terminal #1 includes compensation terminal CP 530 and adjacent terminal #2 includes the programming terminal PD 540. However, it should be appreciated that terminal #1 and terminal #2 may include any terminal of the controller. Additionally, it should be appreciated that terminal #1 and terminal #2 need not be adjacent to the protected terminal (e.g., feedback terminal FB) and that the principals described herein may also be applied to terminals that are not adjacent to the protected terminal.

As shown in FIG. 5, from the supply VDD 505, a bias current source $I_{bias2}$ 510 causes a clamping current $I_{bias2}$ to pass through the diode connected transistor 525, thereby biasing the transistors 535 and 545. In some examples, transistors 525, 535, and 545 are of the same type/structure, causing an equal, or at least substantially equal, voltage drop across the transistors when a current similar to $I_{bias2}$ is drawn from their emitters. As a result, the same voltage appears on the emitter terminals of transistors 535 and 545 relative to ground. In other words, the same offset voltage $V_{offset}$ 520 applied to the emitter of transistor 525 appears on the emitter of transistor 535 coupled to the adjacent terminal #1 530 (e.g., the CP terminal) as well as the emitter of transistor 545 coupled to the adjacent terminal #2 540 (e.g., the PD terminal). As will be described in greater detail below, the value of offset voltage $V_{offset}$ 520 and clamping current $I_{bias2}$ may be selected to cause the Line Under Voltage 425 or Line Over Voltage 435 to be triggered when the feedback terminal FB is accidentally coupled to an adjacent terminal, such as adjacent terminal #1 530 or adjacent terminal #2 540. $V_{offset}$ 520 and clamping current $I_{bias2}$ may be positive or negative. In some examples, offset voltage $V_{offset}$ 520 is about 200 mV; however, it should be appreciated that other voltages may be used depending on the system configuration.

In the event that feedback terminal FB (156 in FIG. 1, 218 in FIG. 2A, 228 in FIG. 2B, 248 in FIG. 2C, and 268 in FIG. 2D) couples to any of adjacent terminal #1 or adjacent terminal #2 (e.g., PD 230 or CP 226 in FIG. 2B, PD 250 or CP 246 in FIG. 2C, or PD 270 or CP 266 in FIG. 2D), for example, during soldering on the PCB board or by any other error, the clamped offset voltage $V_{offset}$ 520 applied to adjacent terminal #1 530 or adjacent terminal #2 540 appears on the feedback terminal FB and sources to the FB terminal an additional clamping current $I_{bias2}$ 512 that is mirrored from transistor 525 on transistors 535 and 545. Specifically, as discussed above with respect to FIG. 4, when switching element 150 is in the ON state and a negative voltage is induced in the bias winding 126, the fault detection circuitry 402 clamps the voltage at the feedback node FB 456 to zero. However, when the feedback terminal FB is coupled to adjacent terminal #1 or adjacent terminal #2, the offset voltage (that in some examples is around 200 mV) instead appears on the feedback terminal FB.

Referring back to FIG. 4, during switch ON time, the fault detection circuitry 402 is active and expects a negative voltage at node FB 456 representing an input voltage level that, in normal operation, is above the line under voltage threshold. A current 407 (n×I) is sourced from the VDD bus 405 through M1 410 and a fraction (1×I) of it (current 427) is mirrored on M2 420. During normal operation, current 427 is higher than the reference current source of under voltage threshold $t_{uv}$ 428. As a result, node 421 is pulled high and output signal LUV 425 of the inverted output buffer 422 remains low, preventing the activation of line under voltage fault detection.

However, when there is an unwanted coupling from an adjacent terminal, for example, terminal 530 or 540 (FIG. 5), a positive clamped offset voltage $V_{offset}$ 520 appears at FB terminal (node 456) during the power switch ON time. The presence of the positive offset voltage $V_{offset}$ 520 sources the additional clamping current $I_{bias2}$ 512 mirrored from transistor 525 on transistors 535 and 545 (FIG. 5) and causes a lower current to flow through M1 410, thereby causing a scaled down mirrored current 427 in M2 420 that may be lower than the reference current source of under voltage threshold $t_{uv}$ 428. This may result in node 421 being pulled low to ground and output signal LUV 425 of the inverted output buffer 422 going high to activate the line under voltage fault protection circuitry. Thus, the line under voltage fault protection may serve a double functionality of line under voltage protection as well as detecting a coupling between the FB terminal and any of its adjacent terminals.

Similarly, during switch ON time, the fault detection circuitry 402 is active and expects a negative voltage at node FB 456 representing an input voltage level that, in normal operation, is below the line over voltage threshold so that a current 407 (n×I) sourced from the VDD bus 405 through M1 410 provides a mirrored current 437 in M3 430 having a value that is fraction (1×I) of the current 407 and that is lower than the reference current source of over voltage threshold $I_{OV}$ 438. As a result, node 431 at the input of buffer 432 is pulled low and its non-inverted output signal LOV 435 remains low, preventing activation of line over voltage fault detection. However, in some examples where the offset voltage $V_{offset}$ 520 may be negative and offset clamping current may be sinked out of FB terminal instead of sourcing to the FB terminal, any unwanted coupling to the feedback terminal causes a greater amount of current to be sourced from the VDD bus 405 through M1 410. As a result, a greater amount of current is mirrored on M3 430 that may be larger than the reference current source of the over voltage threshold $I_{OV}$ 438. This may cause the voltage at node 431 to be pulled high and output signal LOV 435 of buffer 435 going high to activate the line over voltage protection circuitry. Thus, the line over voltage fault protection may serve a double functionality of line over voltage protection as well as detecting an accidental coupling between the FB terminal and any of its adjacent terminals.

Figure 6:
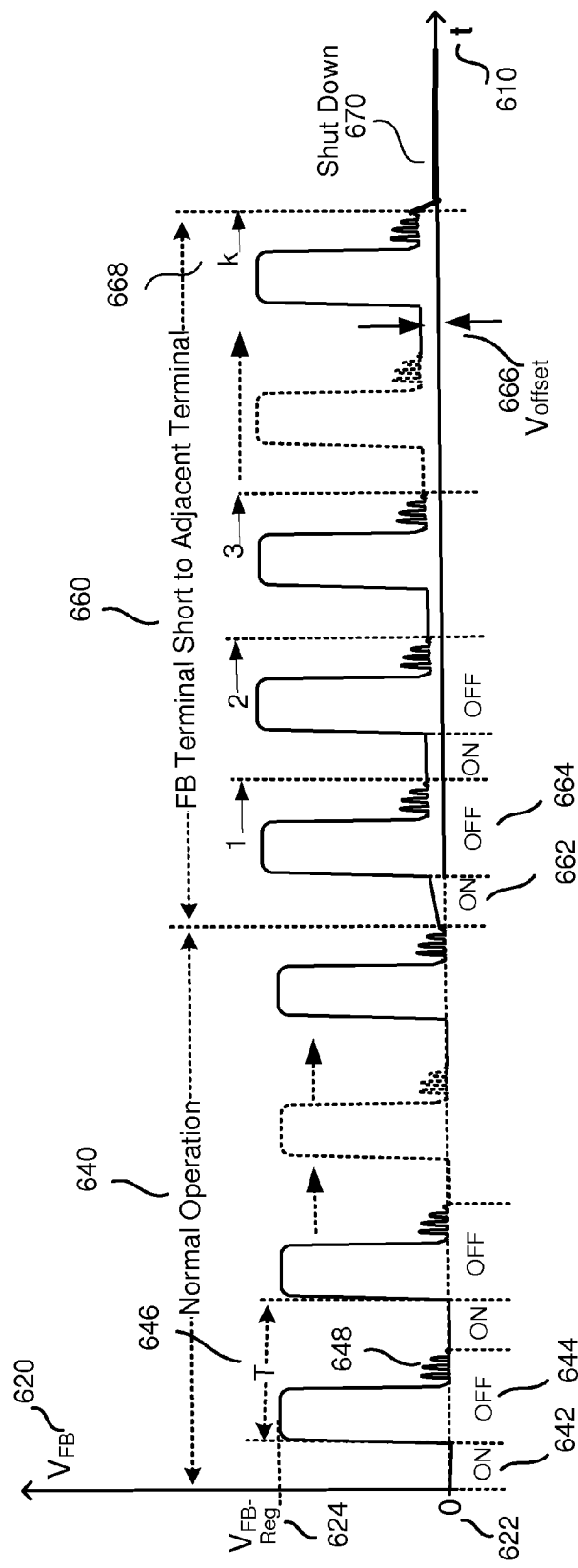
FIG. 6 illustrates an exemplary voltage waveform of the voltage at the feedback terminal of a controller before and after the feedback terminal is coupled to a terminal having an applied offset voltage and clamp current.

To illustrate the effect of a short or a coupling between the feedback terminal FB and an adjacent terminal having an offset voltage, FIG. 6 illustrates an exemplary voltage waveform for the feedback voltage $V_{FB}$ 620 on the feedback terminal FB (156 in FIG. 1, 218 in FIG. 2A, 228 in FIG. 2B, 248 in FIG. 2C, 268 in FIG. 2D, and 456 in FIG. 4) during normal operation (interval 640) and after an unwanted coupling between the feedback terminal FB to one of either the adjacent terminal #1 (e.g., compensation terminal CP 226, 246, or 266 shown in FIG. 2B, FIG. 2C, and FIG. 2D, respectively) or the adjacent terminal #2 (e.g., programming terminal PD 230, 250, or 270 shown in FIG. 2B, FIG. 2C, and FIG. 2D, respectively) (interval 660).

Specifically, during normal operation 640 and at each switching period T 646, whenever the switching element 150 is in the ON state 642, the voltage $V_{FB}$ 620 on the feedback terminal FB is clamped to zero 622 by the fault detection circuitry 402. When the switching element 150 is in the OFF state 644, the voltage $V_{FB}$ 620 on the feedback terminal FB is representative of the output voltage and may be used for output regulation. During this time, the voltage $V_{FB}$ 620 goes high to $V_{FB-Reg}$ 624. The sensed and sampled voltage level $V_{FB-Reg}$ 624 may be used through regulation circuitry (not shown) to control switching and transfer of energy to the output.

In the event that the FB terminal accidentally shorts or couples to an adjacent terminal, the offset voltage $V_{offset}$ 666 (in some examples around 200 mV) and clamp current is applied from the adjacent terminal to the feedback terminal, shifting $V_{FB}$ 620 by the offset value $V_{offset}$ 666, as shown by the $V_{FB}$ 620 waveform during the duration identified as "FB Terminal Short to Adjacent Terminal" 660. The offset value $V_{offset}$ 666 and clamp current during the ON time of power switch has a dominant effect on operation of the zero clamping circuit described in FIG. 4.

During the time that the switching element 150 is in the ON state, the feedback terminal FB retrieves information to detect LUV or LOV faults. Specifically, the offset voltage and clamp current, if applied to feedback terminal FB due to accidental coupling to either of the adjacent terminals, may cause triggering of the LUV or LOV fault detection circuitry as described above with respect to FIG. 4.

In some examples, to avoid false shutdowns and to ensure that an actual coupling between the FB terminal and an adjacent terminal has occurred, a counter may be used to identify a threshold number of switching cycles k 668 in which the offset voltage $V_{offset}$ 666 and clamp current persistently exists at the feedback terminal FB. Specifically, a counter may be activated in response to the first occurrence of the offset voltage $V_{offset}$ 666 and clamp current during an ON state 662 that triggers the LUV of LOV fault signal (e.g., LUV fault signal 425 or LOV fault signal 435 in FIG. 4). The counter may be configured to count for a threshold number of successive switching cycles k 668 in which the offset voltage $V_{offset}$ 666 and clamp current causes the LUV or LOV fault signal to be triggered. In response to the threshold number of successive switching cycles k 668 being identified by the counter, the controller may shut down the power converter, resulting in the feedback voltage $V_{FB}$ to drop to zero 670. In some examples the threshold number of successive switching cycles k may be 8. However, it should be appreciated that other values may be used depending on the system configuration and desired confidence that an actual coupling has occurred.

In some examples, after shutdown, the controller enters an auto-restart mode in which it repeats intervals of shutdown and restart. Specifically, after each fault detection, the controller enters the shutdown interval after which it restarts to check for a fault condition. If the fault condition still exists, then the controller again enters the shutdown interval. The controller cycles between the shutdown and restart intervals for any number of times until the fault condition no longer exists.

Figure 7:
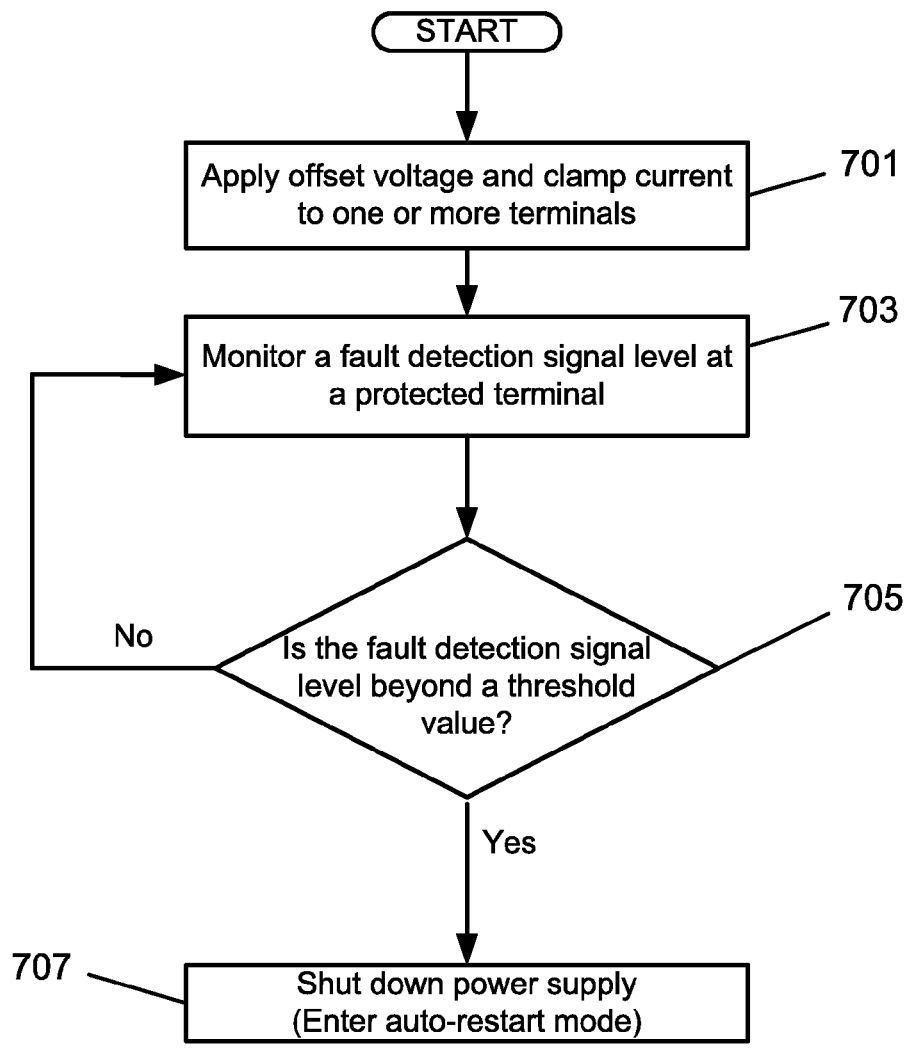
FIG. 7 illustrates a flow chart for an exemplary process for detecting an unwanted coupling between terminals of a controller.

FIG. 7 shows a flow chart for an exemplary process 700 for detecting an unwanted coupling between a protected terminal and another terminal of a controller. At block 701, an offset voltage and clamp current may be applied to one or more terminals of a controller. In some examples, the offset voltage and clamp current may be applied to one or more terminals that are adjacent to the protected terminal, while in other examples, the offset voltage and clamp current may be applied to one or more terminals that are not adjacent to the protected terminal. The positive or negative offset voltage and clamp current may be applied using circuitry similar or identical to offset and clamp circuitry 500 discussed above. In some examples, this circuitry may be used to apply an offset voltage and clamp current to terminals (in some examples, applied to a programming terminal and a compensation terminal) that are adjacent to a protected terminal (in some examples, the feedback terminal) of the controller. The offset voltage and clamp current may be positive or negative and may have any value depending on the particular system implementation.

At block 703, a fault detection signal (e.g., a fault detection current) level may be monitored by fault detection circuitry coupled to the protected terminal. For example, circuitry similar or identical to fault detection circuitry 402 may be used to monitor the presence of an offset voltage and clamp current at the protected terminal (e.g., the feedback terminal FB) of a controller by monitoring the amount of fault detection current caused to flow in the protected terminal by the offset voltage and clamp current at that terminal.

At block 705, the monitored fault detection signal level (in one example, the fault detection current) can be compared to a fault threshold (e.g., an upper threshold or a lower threshold). In some examples, circuitry similar or identical to fault detection circuitry 402 may be used to compare the monitored fault detection signal (e.g., fault detection current) to a reference current representative of the upper threshold or the lower threshold. If, during the ON state of a switching element of the power supply, the signal is beyond the threshold (e.g., above the upper threshold or below the lower threshold), the process may move to block 707. However, if the signal is within the threshold (e.g., below the upper threshold or above the lower threshold), the signal may continue to be monitored by having the process return to block 703.

In some examples, at block 705, a counter may be used to determine if a predefined threshold number of consecutive cycles have occurred in which the fault detection signal (e.g., fault detection current) exceeds the threshold values. If the threshold number of cycles is reached, then the process may proceed to block 707. However, if the value of the signal returns to within the threshold values before the threshold number of cycles is reached, then the process may return to block 703

At block 707, the power supply may be shut down. In some examples, a controller similar or identical to controllers 160 or 260 may be used to shut down the power supply. In some examples, at block 707, the controller may enter an auto-restart mode after shutting down the power supply.

The above description of illustrated examples of the present invention, including what is described in the Abstract, is not intended to be exhaustive or to be limited to the precise forms disclosed. While specific embodiments of, and examples for, the invention are described herein for illustrative purposes, various equivalent modifications are possible without departing from the broader spirit and scope of the present invention. Indeed, it should be appreciated that the specific example voltages, currents, frequencies, power range values, times, etc., are provided for explanation purposes and that other values may also be employed in other embodiments and examples in accordance with the teachings of the present invention.

The invention claimed is:

1. A controller for regulating a power converter, the controller comprising:
   a first terminal operable to receive a feedback signal, wherein the first terminal is adjacent to a second terminal and a third terminal;
   feedback circuitry coupled to the first terminal and operable to receive the feedback signal;
   driver circuitry operable to generate a drive signal configured to switch a power switch between an ON state and an OFF state to regulate the output of the power converter, wherein the drive signal is generated based at least in part on the feedback signal;

fault detection circuitry coupled to the first terminal, the fault detection circuitry operable to detect a fault condition in response to a fault detection current flowing in the first terminal being greater than an upper threshold current or less than a lower threshold current; and offset and clamp circuitry coupled to the second terminal and to the third terminal, wherein the offset and clamp circuitry is operable to:
supply a clamping current to the second terminal and to the third terminal; and
offset a voltage on the second terminal and a voltage on the third terminal by an offset voltage, wherein the offset voltage and clamping current cause the fault detection current flowing in the first terminal to be greater than the upper threshold current or less than the lower threshold current when the first terminal is coupled to the second terminal or to the third terminal.

2. The controller of claim 1, wherein the fault condition comprises one or more of an input line over voltage condition and an input line under voltage condition.

3. The controller of claim 2, wherein the driver circuitry is operable to shut down the power converter in response to a detection of the input line over voltage condition or the input line under voltage condition.

4. The controller of claim 2, wherein the input line over voltage condition is detected in response to the fault detection current being greater than the upper threshold current, and wherein the input line under voltage condition is detected in response to the fault detection current being less than the lower threshold current.

5. The controller of claim 4, wherein the offset voltage is positive and causes the fault detection current to be less than the lower threshold current when the first terminal is coupled to the second terminal or to the third terminal.

6. The controller of claim 4, wherein the offset voltage is negative and causes the fault detection current to be greater than the upper threshold current when the first terminal is coupled to the second terminal or to the third terminal.

7. The controller of claim 1, wherein feedback signal is representative of an output of the power converter while the power switch is in the OFF state, and wherein the feedback signal is representative of an input line voltage while the power switch is in the ON state.

8. The controller of claim 7, wherein the fault detection current is representative of the input line voltage while the power switch is in the ON state.

9. The controller of claim 1, wherein the fault detection circuitry comprises:
a first transistor, wherein the fault detection current flows through the first transistor;
a second transistor coupled to the first transistor as a current mirror;
a first current source coupled to the second transistor, the first current source having a value representative of the lower threshold;
a third transistor coupled to the first transistor as a current mirror; and
a second current source coupled to the third transistor, the second current source having a value representative of the upper threshold.

10. The controller of claim 1, wherein the offset and clamp circuitry comprises:
a current source operable to generate a bias current;
a direct current offset voltage source, the direct current offset voltage source having a value equal to the offset voltage;
a first transistor coupled to the current source and to the direct current voltage source, wherein the bias current flows through the first transistor;
a second transistor coupled to the first transistor as a current mirror, wherein the second transistor is further coupled to the second terminal; and
a third transistor coupled to the first transistor as a current mirror, wherein the third transistor is further coupled to the third terminal.

11. The controller of claim 1, wherein the second terminal is a programming terminal of the controller, and wherein the third terminal is a compensation terminal of the controller.

12. The controller of claim 1, wherein the controller is a primary-side controller.

13. The controller of claim 1, wherein the controller further comprises a counter operable to count a number of consecutive cycles of the detected fault condition, wherein the controller is operable to shut down the power converter in response to the counter reaching a threshold value.

14. A primary-side regulated power converter comprising:
a power switch;
an energy transfer element coupled to the power switch to galvanically isolate an input of the power converter from an output of the power converter and to transfer energy between the input and output of the power converter;
a bias winding coupled to the energy transfer element, wherein the bias winding is configured to generate a bias winding feedback signal representative of an output voltage at the output of the power converter and an input voltage of the power converter; and
a controller operable to generate a drive signal configured to switch the power switch between an ON state and an OFF state to regulate the output of the power converter, wherein the drive signal is generated based at least in part on the bias winding feedback signal, and wherein the controller comprises:
a first terminal operable to receive the bias winding feedback signal, wherein the first terminal is adjacent to a second terminal and to a third terminal;
fault detection circuitry coupled to the first terminal, the fault detection circuitry operable to detect a fault condition in response to a fault detection current flowing in the first terminal being greater than an upper threshold current or less than a lower threshold current; and
offset and clamp circuitry coupled to the second terminal and to the third terminal, wherein the offset and clamp circuitry is operable to:
supply a clamping current to the second terminal and to the third terminal; and
offset a voltage on the second terminal and a voltage on the third terminal by an offset voltage, wherein the offset voltage and clamping current cause the fault detection current flowing in the first terminal to be greater than the upper threshold current or less than the lower threshold current when the first terminal is coupled to the second terminal or to the third terminal.

15. The power converter of claim 14, wherein the fault condition comprises one or more of an input line over voltage condition and an input line under voltage condition.

16. The power converter of claim 15, wherein the input line over voltage condition is detected in response to the fault detection current being greater than the upper threshold current, and wherein the input line under voltage condition is detected in response to the fault detection current being less than the lower threshold current.

17. The power converter of claim 16, wherein the offset voltage is positive and causes the fault detection current to be less than the lower threshold current when the first terminal is coupled to the second terminal or to the third terminal.

18. The power converter of claim 16, wherein the offset voltage is negative and causes the fault detection current to be greater than the upper threshold current when the first terminal is coupled to the second terminal or to the third terminal.

19. The power converter of claim 14, wherein the fault detection circuitry comprises:
   a first transistor, wherein the fault detection current flows through the first transistor;
   a second transistor coupled to the first transistor as a current mirror;
   a first current source coupled to the second transistor, the first current source having a value representative of the lower threshold;
   a third transistor coupled to the first transistor as a current mirror; and
   a second current source coupled to the third transistor, the second current source having a value representative of the upper threshold.

20. The power converter of claim 14, wherein the offset and clamp circuitry comprises:
   a current source operable to generate a bias current;
   a direct current offset voltage source, the direct current offset voltage source having a value equal to the offset voltage;
   a first transistor coupled to the current source and to the direct current voltage source, wherein the bias current flows through the first transistor;
   a second transistor coupled to the first transistor as a current mirror, wherein the second transistor is further coupled to the second terminal; and
   a third transistor coupled to the first transistor as a current mirror, wherein the third transistor is further coupled to the third terminal.

21. The power converter of claim 14, wherein the controller further comprises a counter operable to count a number of consecutive cycles of the detected fault condition, wherein the controller is operable to shut down the power converter in response to the counter reaching a threshold value.

22. A method for detecting a coupling between terminals of a controller, the method comprising:
   monitoring a fault detection current flowing in first terminal, wherein the first terminal is adjacent to a second terminal and a third terminal;
   applying an offset voltage and clamping current to the second terminal and to the third terminal; and
   determining whether the fault detection current is greater than an upper threshold current or below a lower threshold current, wherein the offset voltage and clamping current is operable to cause the fault detection current to be greater than the upper threshold current or below the lower threshold current when the first terminal is coupled to the second terminal or to the third terminal.

23. The method of claim 22, wherein the offset voltage is positive and causes the fault detection current to be less than the lower threshold current when the first terminal is coupled to the second terminal or to the third terminal.

24. The method of claim 22, wherein the offset voltage is negative and causes the fault detection current to be greater than the upper threshold current when the first terminal is coupled to the second terminal or to the third terminal.

* * * * *